(12) United States Patent
Zhang

(10) Patent No.: US 6,863,268 B2
(45) Date of Patent: Mar. 8, 2005

(54) DEW POINT HUMIDIFIER (DPH) AND RELATED GAS TEMPERATURE CONTROL

(76) Inventor: Chaojiong Zhang, 762 Peach Creek Cut Off Rd., College Station, TX (US) 77845

( * ) Notice: Subject to any disclaimer, the term of this patent is extended or adjusted under 35 U.S.C. 154(b) by 14 days.

(21) Appl. No.: 10/428,582

(22) Filed: May 2, 2003

(65) Prior Publication Data

US 2003/0188638 A1 Oct. 9, 2003

Related U.S. Application Data

(63) Continuation-in-part of application No. 10/118,716, filed on Apr. 9, 2002, now Pat. No. 6,715,743.
(60) Provisional application No. 60/333,585, filed on Nov. 27, 2001, and provisional application No. 60/421,508, filed on Oct. 28, 2002.

(51) Int. Cl.[7] .................................................. B01F 3/04
(52) U.S. Cl. ....................... 261/130; 261/142; 261/156; 261/65; 261/DIG. 10; 96/350
(58) Field of Search ........................ 261/65, 126, 129, 261/130, 131, 139, 142, 153, 156, DIG. 10; 96/349, 350

(56) References Cited

U.S. PATENT DOCUMENTS

| | | | |
|---|---|---|---|
| 2,610,282 A | * 9/1952 | Brownell ..................... 392/485 |
| 3,015,190 A | * 1/1962 | Arbeit ........................ 65/134.4 |
| 3,219,795 A | * 11/1965 | Wiseman ..................... 392/402 |
| 4,297,563 A | * 10/1981 | Berry ......................... 392/398 |
| 4,450,118 A | * 5/1984 | Tuin .......................... 261/147 |
| 4,618,462 A | * 10/1986 | Fisher ........................ 261/130 |
| 5,262,250 A | 11/1993 | Watanabe | |
| 5,520,858 A | * 5/1996 | Yamaguchi et al. ........ 261/130 |
| 5,952,119 A | 9/1999 | Wilson | |
| 5,965,288 A | 10/1999 | Okamoto | |
| 5,996,976 A | 12/1999 | Murphy et al. | |
| 6,066,408 A | 5/2000 | Vitale et al. | |
| 6,135,433 A | * 10/2000 | Nurmi ........................ 261/128 |
| 6,202,991 B1 | 3/2001 | Coniglio et al. | |
| 6,284,399 B1 | 9/2001 | Oko et al. | |
| 6,299,147 B1 | * 10/2001 | Mitter ........................ 261/128 |
| 6,338,472 B1 | 1/2002 | Shimazu et al. | |
| 6,383,671 B1 | 5/2002 | Andrews et al. | |
| 6,715,743 B2 | * 4/2004 | Zhang ........................ 261/130 |

* cited by examiner

Primary Examiner—Scott Bushey
(74) Attorney, Agent, or Firm—Law Office of Tim Cook P. C.

(57) ABSTRACT

A method of humidifying gases to 100% relative humidity and a humidifier to carry out such a method are provided to humidify gases for fuel cells and for other applications. The humidification of gases is thermally controlled and thermal energy is managed to provide an efficient system. A pre-humidifier accommodates a wide range of flow rates of dry gas to initially humidify and pre-heat the gas, and a boiler provides steam to mix with the effluent from the pre-humidifier to humidify the gas to saturation. A thermal insulator between the boiler and bulk water and/or pre-humidifier enhances the steam generation from the boiler and prevents direct heating of water or gases by heat from the boiler. Above the boiler, bulk water, and pre-humidifier, a mixing chamber further functions as a condenser and water separator. The mixing chamber provides a space for mixing gases and steam and separates saturated gases from condensed water. By vapor condensation during the mixing, the gas can be humidified completely to its dew point at given temperature and pressure conditions.

33 Claims, 3 Drawing Sheets

DEW POINT HUMIDIFIER (DPH) AND RELATED GAS TEMPERATURE CONTROL

CROSS REFERENCE TO RELATED APPLICATIONS

This is a Continuation-in-Part of U.S. patent application Ser. No. 10/118,716 filed Apr. 9, 2002, now U.S. Pat. No. 6,715,743, which claims the benefit of Provisional Application Ser. No. 60/333,585, filed Nov. 27, 2001, now expired. Further, this application claims the benefit of Provisional Application Ser. No. 60/421,508, filed Oct. 28, 2002, now expired.

FIELD OF INVENTION

The present invention relates generally to the field of continuous flow gas humidification systems, and, more particularly, to a method and a system for humidifying gas reactants for fuel cells or other gases. It also relates to the field of temperature control and tracing of the humidified gas.

BACKGROUND OF INVENTION

As described in U.S. Pat. No. 6,338,472 to Shimazu et al., humidifiers, like those of the field of the present invention, are typically used to humidify process gases supplied to an anode or a cathode of a Solid Polymer Fuel Cell (SPFC). The process gases comprise a fuel gas provided to the anode and an oxidizing gas provided to the cathode. A solid polymer fuel cell generates electrical energy by electrochemical reactions in which protons generated from a fuel supplied to the anode transfer to the cathode through an electrolyte membrane and react with an oxidizing gas supplied to the cathode to produce water. The humidifier of the present invention, however, is not limited to fuel cells, but is generally applicable to the humidification of gases.

Similarly, a Proton Exchange Membrane Fuel Cell (PEMFC), in contrast to the SPFC device, generally consists of three main components: (1) a porous diffusion catalytic anode, (2) a proton conductive membrane, and (3) a porous diffusion catalytic cathode. The PEMFC converts chemical energy to electrical energy with catalytic electrochemical reactions of hydrogen and oxygen at the anode and cathode, respectively. During the process, the conductivity of the proton exchange membrane plays an important role in the performance of the PEMFC. The membrane conductivity, however, depends on its water content. Usually, high water content gives high conductivity. In fact, fuel and oxidant gases must be humidified to maintain adequate water content in the membrane, therefore requiring a humidifier and a method of humidifying reactant gases.

To operate a fuel cell normally, whether a SPFC or a PEMFC, the membrane must be kept wet. To keep the membrane wet, the process gases are typically humidified by one or more of a variety of techniques. For example, one commonly used technique, referred to herein as a "bubbling-type" humidifier, involves bubbling reactant gases up through a container of heated water so that water molecules are taken up with the reactant gases. An energy source is provided to facilitate the water evaporation into the gas bubbles or gas stream through the container.

In order to make gases highly humidified, the flow rate of gases should be low enough, or the residence time in water should be long enough. Also, the distribution of gases in the liquid water has a large influence on the final humidity of gases. A bubbling-type humidifier should also avoid leaving water droplets to be carried out by the gas stream, even when flow rate is relatively low because there is no typically gas-water separation function in such a humidifier. This method of humidification has the advantage of being very simple and inexpensive. However, typical bubbling-type humidifiers cannot deliver 100% relative humidity to gases and only allow relatively low gas flow rate for a certain cross area of humidifier. Another disadvantage of this method is its uncertainty as to just how much humidity has been imparted to gases as the gases leave the outlet of the humidifier. Many factors, including water temperature, flow rate, gas distribution, inlet gas temperature and humidity, physical structure and condition of the humidifier, affect humidity at outlet.

In bubbling-type humidifiers, it is difficult to control humidity unless using a feedback signal developed from the measurement of actual humidity value at the humidifier outlet. Even with such controls, the bubbling-type humidifier requires a relatively large cross section area and water height to humidify the gas and the response time for change of humidity is very long.

In another conventional method, referred to herein as "steam injection or steam mixing", water vapor steam is injected, usually in an excess amount, into a dry gas stream to form a gas-vapor-water droplet mixture. The mixture then flows through a heat exchanger to condense down to a set temperature by a chilling coolant. Water droplets and extra water vapor in the mixture condense to a water stream, which is further separated from the gas-vapor stream by a water separator and a water drain. Because there is a condensation process, the set temperature is equal to the Dew Point Temperature. In order to have a condensation procedure, extra water vapor steam must be used. In this technology, a separate boiler, condenser, chiller, water drain and their own individual control systems are usually needed. In order to maintain good control of the dew point temperature, these types of humidifiers are usually bulky, complicated, and expensive with very low energy efficiency.

Another known technique for humidifying reactant gases uses a "membrane-type" humidifier. One example of a membrane-type humidifier is shown and described in U.S. Pat. No. 5,996,976 to Murphy et al. In this technique, water is pumped through a heating element and then directed to one side of a porous membrane. The gases to be humidified are directed across the other side of the membrane. Water molecules penetrate the membrane from the heated water side to the reactant gas side where the water molecules evaporate into the gases and the gases absorb heat from the water. The water may be circulated through a heating chamber as described, or the water may be heated directly in an evaporation chamber. The temperature of the gas-vapor mixture is lower than the temperature of the water because evaporation occurs at the surface of the membrane. Because of this phenomenon, the temperature and humidity of the gas-vapor mixture is rather difficult to control. Further, the difficulty of control increases as the rate of gas flow increases because the amount of heat absorbed from the water is relatively high. Further, a specialized membrane is required, increasing the overall cost of such a system. Again, there is no mechanism to guarantee precise humidity control without further condensation or employment of a humidity sensor.

U.S. Pat. No. 5,262,250 to Watanabe and U.S. Pat. No. 5,952,119 to Wilson teach a kind of self-humidification method for membrane electrode assemblies of fuel cells. The former uses some narrow path or wicks within a membrane and the latter sews hydrophilic thread through a backing layer to enhance the humidification of the membrane. However effective such self-humidification may be in a laboratory environment, it is difficult for commercial manufacturing in a large scale.

Yet another technique for the humidification of a gas involves the application of ultrasonic energy to the gas and a water bath. A quantity of water is contained within an enclosure and gas is introduced to the volume within the enclosure above the surface of the water. An ultrasonic energy source within the enclosure extends through the gas volume into the water bath. Application of ultrasonic energy generates water vapor, which is taken up by the gas and the gas-vapor mixture is withdrawn from the enclosure. This technique has the advantage of easily controllable humidity of the gas-vapor mixture for "batch" processing of gas, but is not suitable to generate and control the humidity of a continuous stream of gas.

Still another technique for humidification of a gas involves a variation of the steam-injection-type humidifier, wherein water is injected onto a hot element, such as a plate, to evaporate the water into an enclosure. Gas is pumped into the enclosure to mix with the water vapor to develop a gas-vapor mixture. The amount of water that is injected onto the heating element is calculated and controlled to meet certain humidity requirements. Further, the temperature of the exit gas-vapor mixture is controlled by controlling the temperature of the heating element.

However, this factor presents a drawback of this technique in that the heating component must use a certain minimum power to reach a temperature sufficiently high to flash the water to vapor instantly and this minimum temperature is usually much higher than the preferred mixture temperature. Also, it is difficult to quickly change the temperature of the heating element when the flow rate of gas or water changes and it is difficult to precisely control the temperature of the gas-vapor mixture, thus the mixture is likely to be overheated. Even if the mixture temperature can be adequately controlled, the range of flow rate and the range of temperature is unacceptably limited using this technique. This is because this technique requires the simultaneous control of two parameters, i.e. the temperature of the gas-vapor mixture and the temperature of the heating element, in one control loop by one means, i.e. the power to the heating element. It is difficult, if not impossible, to simultaneously control these parameters in a realistic control mechanism.

One proposed solution to this control problem involves the use of a condenser in the stream for the gas-vapor mixture. In principle, the humidification is carried out in two steps and two devices. The first step involves steam injection as previously described to generate an over-heated, over-humidified gas-vapor mixture. The second step involves passing the mixture through the condenser to condense the gas-vapor mixture at its dew point. A chiller is required to carry away the heat released from the condensation to maintain the condenser at the dew point. Thus, additional energy is needed to generate the over-heated and over-humidified mixture in the first step, and even more energy is required to drive the chiller to dissipate the additional heat from the cooling and condensation of the mixture. This means that this technique is very energy inefficient, and it is also bulky, complicated, and expensive to build and use.

Another humidification method for PEMFC is taught in U.S. Pat. No. 6,383,671 to Andrews. This method uses a heater to vaporize liquid water and then lets the steam directly mix with dry gases. Effective humidification may obtained for the reactant gases under certain conditions. However, one of problems with this apparatus is that the reactant gases are not pre-heated; that is, the temperature and humidity of gases are far from saturation status of dew point. When vapor mixes with these cool gases, condensation occurs. This phenomenon makes the precise control of humidity difficult because the gases and steam vapor are not mixed evenly. In order to mix the gases and vapor well, the practical size of this humidifier must be quite large.

Thus, there remains a need for a system and a method of humidifying gases that is energy efficient, simple, and easy to control, and more importantly, provides precisely a desired amount of humidification of a continuous gas stream. The present invention is directed to such a solution.

SUMMARY OF THE INVENTION

The present invention addresses these and other drawbacks in the art by providing a continuous flow of gas through two stages. The first stage provides pre-humidification of reactant gases with a bubbling action, while the second stage provides generating vapor steam in a steam generator and mixing the pre-humidified gases with the vapor steam in a mixing chamber. No permeable membrane is used, and only a single parameter (temperature) is used for precise control of the humidification of the gas at the dew point. That is, the temperature at the outlet is used as the sole parameter to control the operation of the heating element in the steam generator.

Gas is introduced into an enclosure or vessel under pressure. The gas then bubbles up through a bubbling evaporator. Above the water bubbling evaporator, the gas-vapor-water droplets mixture mixes with injected water vapor steam to form saturated gas-vapor-water droplets mixture. The saturated gas-vapor-water droplets mixture then flows through a moisture separation region having "Y"-shaped cross section. Water droplets fall by gravity and inertia to bulk water while saturated gas flows up and exits from the humidifier.

It is therefore an object of the invention to provide a gas humidifier that is simple and easy to control to precisely produce saturated gas at the dew point. It is a further object of the invention to provide a method of humidifying gas with such a humidifier. It is yet another object of the invention to provide a gas humidifier that produces saturated gas at the dew point over a wide range of temperatures using a single measured parameter (temperature) within the enclosure without dew point "calibration". It is another object of the invention to provide simple, economic, and effective means to further heat and trace the gas temperature after humidification.

In order to realize these and other features and advantages of the invention, enhanced thermal insulation is provided between the steam generating boiler and bulk water within the vessel and/or the pre-humidifier. The thermal insulation prevents direct heating of bulk water or pre-humidified gas by heat from the boiler. Thus, thermal energy from a heating element with the steam generating boiler is contained with the boiler to only generate vapor. Heat is therefore passed to the gases only through gas-vapor mixing and/or vapor condensing.

Although the boiler is thermally isolated from other functions of the gas humidifier, openings at the bottom of the boiler are provided so that bulk water from the vessel flows back into boiler. This arrangement eliminates the necessity of a separate water supply and recycling system and further provides water leveling for the pre-humidifier, the condenser/water separator and the boiler. On the other hand, because water flows from the bulk water in the vessel into the bottom of the boiler, the water path does not cause convection of heat from the boiler to the pre-humidifier or the bulk water.

Thermal efficiency of the humidifier is also improved by enhanced thermal insulation applied to the mixer/condenser wall to prevent heat transfer to the gas stream at 100% relative humidity along the path to the outlet of the humidifier. This feature ensures the gas stream remains at 100% relative humidity. The thermal insulation of the boiler and the mixer/condenser eliminates the need to pass the humidified gas through an additional humidification stage.

As previously described, the outlet of the mixing chamber and condenser defines a "Y" shape in cross section. The bulk water level within the vessel is maintained lower than this outlet. This keeps the gas-vapor mixture from flowing through the bulk water and causing bubbling, which would limit the maximum flow rate of gas through the humidifier. This arrangement increases maximum flow rate for the same cross sectional area by more than 10 times without this feature.

From the mixing chamber, the gas vapor mixture makes a number of distinct changes in direction before reaching the outlet of the vapor. This circuitous route for the gas vapor mixture causes water droplets to fall back into the bulk water, while maintaining saturated gas out the outlet of the humidifier. This also means that it is not necessary to use the bulk water or a separate water separator and drain for water separation.

A temperature sensor for (dew point) temperature measurement and control is mounted in an outlet chamber of the humidifier, and not in the bulk water. This measurement point reflects the gas-vapor mixture temperature more accurately than in water.

The mixing chamber also serves as a condenser. Thus, it is not necessary to use bulk water for condensation. Relatively cold, pre-humidified gas cools down the water steam while mixing with it. This cooling process condenses some of the steam in the mixture. Condensed water and the heat it carries with it will be used for pre-humidification and steam generation. This condensation recycles water and heat for natural, automatic heat and water balancing.

In a presently preferred embodiment of the invention, the same coolant (such as, for example, city water or chill water) is used for temperature regulation in the humidifier, the gas heater, the gas line and the humidity sensor assembly. This feature simplifies the control system and makes temperature control smooth and stable. When city water is used, it eliminates a complicated, separate cooling, heating, and circulating systems for each of those functions.

These and other features and advantages of this invention will be readily apparent to those skilled in the art from a review of the following detailed description along with accompany drawing figures.

DETAILED DESCRIPTION OF PREFERRED EMBODIMENTS

Figure 1:
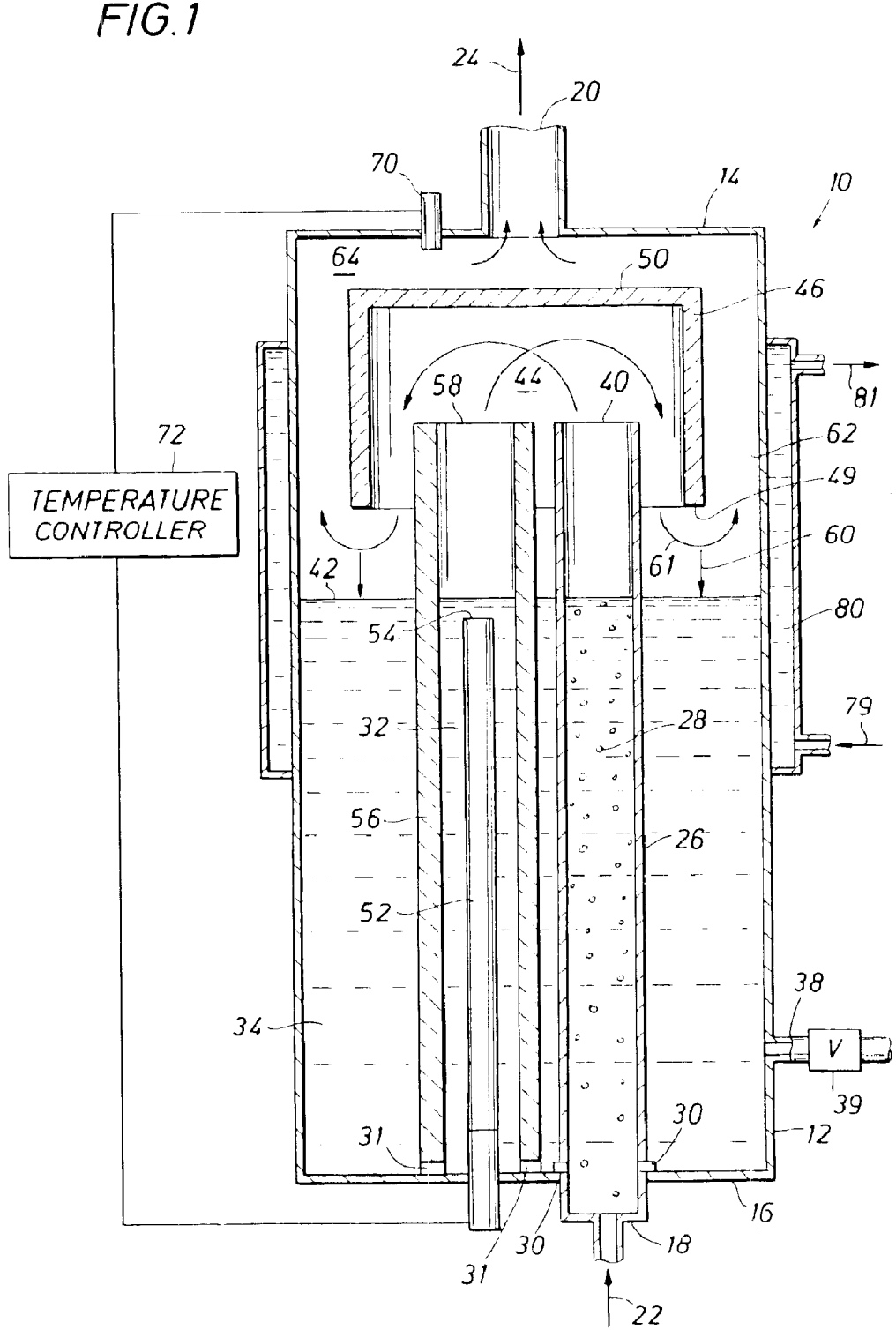
FIG. 1 is an elevation view of a dew point humidifier of the invention.

FIG. 1 show the core structure of a humidifier 10 and a method humidifying gas, in accordance with the present invention. The humidifier 10 principally comprises a vessel 12, preferably cylindrical in aspect, with a top 14 and a bottom 16. An inlet line 18 introduces dry gas into the vessel 12, and an outlet 20 directs humidified gas from the vessel. Dry gas is shown entering the vessel by an arrow 22 and humidified gas is shown exiting the vessel by an arrow 24.

The dry gas 22, which is at a lower temperature than set dew point temperature, is initially humidified by flowing through pre-humidifier 26. The dry gas 22 bubbles up through the pre-humidifier 26 forming bubbles 28, which rise up through the pre-humidifier, thereby picking up some moisture and being warmed to a higher temperature by the water in the pre-humidifier column. The pre-humidifier 26 defines an elongated container, such as a tube, with openings 30, preferably along the bottom of the tube inside the vessel.

The openings 30 provide a water path to a boiler 32, which is also preferably an elongated container, such as a tube, adjacent to the pre-humidifier 26. The openings 30 further provide a water flow path to a reservoir 34 of bulk demineralized water retained with the vessel. A water inlet 38 provides makeup water to make up for water released from the vessel in humidified gas, as controlled by a control valve 39.

The pre-humidifier 26 defines an open top outlet 40, preferably above a water level 42 of the bulk demineralized water. The gas bubbles 28 rise up through the pre-humidifier, and when gas flow rate is very slow, the pre-humidifier functions in the manner of a conventional bubbling humidifier. However, when gas flow rate is high, a large volume of gas mixes with small amount of water and this action develops a foam-like mixture, the mixture includes a humidified gas. The foam-like mixture rises out of the outlet 40 of the pre-humidifier, carrying a substantial quantity of water, and into a mixing chamber 44. The mixing chamber 44 is defined by a cylindrical thermal insulator 46 having a cylindrical, vertically oriented side member and a horizontally oriented top 50. The side member need not be cylindrical, but may take other shapes, so long as it defines an open bottom container with a bottom edge 49 above the water level and below the tops of the pre-humidifier and the boiler. The mixing chamber wall is thermally insulated so that a 100% relative humidity gas-vapor mixture flows up through an annulus 62 between the mixing chamber and the inside surface of the vessel 12 will not be heated up.

At this point, it should be noted that the pre-humidifier functions in a substantially different manner than a conventional bubbling humidifier. In a bubbling humidifier, only water vapor with no water droplets should get out from the water retained within the bubbling humidifier. The flow rate through a bubbling humidifier is hence very limited. However, the pre-humidifier of the present invention can pass a gas stream of very high flow rate, in fact more than ten times higher than that of a conventional bubbling humidifier with same cross section.

Returning to FIG. 1, positioned within the boiler 32 is a heater element 52. Preferably, the heater element is a resistive element, although other heating means may be used within the spirit of the invention. The heater element terminates a top end 54, which is positioned below the water level 42. The heater element generates water vapor steam in the boiler, which is enclosed within a thermal-insulated wall 56. Water vapor steam rises from the boiler and out an open top 58 into the mixing chamber 44. Just as with the pre-humidifier, the boiler 32 includes openings 31 along the inside surface of the bottom 16 for the flow of bulk water from the vessel into the bottom of the boiler. Bulk water also flows into the bottom of the pre-humidifier through the openings 31.

Water vapor steam is released from the boiler 32 into the mixing chamber 44, which also serves as a condenser to condense steam into droplets which fall back into the bulk water. The steam released from the open top or outlet of the boiler flows naturally and freely, without obstruction. The boiling temperature within the boiler is typically much higher than the set dew point temperature in the present invention. However, pre-humidified gas exiting the pre-humidifier 26 is typically cooler than the dew point temperature. Thus, pre-humidified gas from the pre-humidifier, which is cooler than the dew point, mixes with steam from boiler, which is typically hotter than the dew point.

Under normal operating conditions, water steam mixes with the pre-humidified gas and heats it. In doing so, the water steam releases thermal energy, thereby cooling down to the point that it condenses in the mixing chamber and condenser. As long as there is a condensing process, the mixture in the mixing chamber by definition is saturated. The mixing procedure generates 100% relative humidity gas-vapor mixture in the mixing chamber at a predetermined dew point temperature or higher. The mixing procedure also generates condensed water droplets 60 at a temperature around the dew point temperature. The water droplets carry heat from condensation process to the pre-humidifier.

The mixture of water droplets, water steam, and pre-humidified gas flows down between the outside of the tube forming the pre-humidifier and the side member of the mixing chamber 44. A water separator or moisture separation region 61 is defined at the bottom edge of the side member. In cross section, the water separator 61 resembles a "Y" shape. In that way, the moisture separation region has a downward gas-water mixture path, an upward gas path, and a water collector below the bottom edge. As the steam/gas mixture flows downward out the bottom of the mixing chamber, gravity and inertia force the condensed water droplets to continue down to flow into the bulk water. Saturated steam, however, flows down under the bottom edge of the side member, continuing to flow in the annulus 62 between the outside surface of the side member and the inside surface of the vessel. This flow action effectively separates the heavier water droplets from the saturated steam. It also retains the energy contained in the water droplets and this energy is returned to the bulk water. The gas, now saturated with water, flows up through the annulus 62 and into an exit chamber 64, above the top surface of the horizontally oriented top 50. The saturated gas then exits the vessel at the gas outlet 20.

Note that the gas and vapor mixture makes six distinct changes of direction from the mixing chamber to the outlet 20. It moves (1) horizontally outward, then (2) downward, then (3) horizontally outwardly again, then (4) vertically upward, then (5) horizontally inward, and finally (6) vertically upward out the outlet. This circuitous route eliminates the water droplets from the gas and vapor mixture, ensuring a saturated gas at the outlet.

The water level 42 is lower than the outlet of mixing chamber 44. This structure prevents the gas-vapor mixture from flowing through water. Water level is maintained by a water level sensor and a water pump (not shown). If the gas-vapor mixture were to flow through water, the turbulent action could potentially create a foaming action, thereby carrying water droplets up to the outlet of the humidifier, severely limiting the maximum gas flow rate. Thus, placing the outlet of the mixing chamber above the bulk water level increases the maximum flow rate of gas through the humidifier by a factor of ten, over a bubbling-type humidifier of the same cross sectional area.

A temperature sensor 70 is mounted on the top of the vessel, penetrating into the outlet chamber 64. In this way, the precise temperature of the saturated gas is measured by the sensor 70. The sensor 70 provides a temperature measurement to a temperature controller 72, which controls the cycling of the heater element 52 in the boiler. This function controls the temperature of gas-vapor mixture at the gas outlet 20 to be at the desired dew point temperature by adjusting the thermal energy provided by the boiler 32. Because the gas-vapor mixture is at 100% relative humidity, the temperature at the outlet 20 is at true dew point temperature. Dew point temperature is hence accurately controlled by controlling this gas outlet temperature. To further assist in temperature regulation, a jacket 80 may be mounted on the outer surface of the vessel to circulate chilled or ambient temperature water, fed from a chill water inlet 79 and emptying into a chill water outlet 81. This feature of the invention is described in greater detail in respect of FIG. 3.

As previously described, water and heat from condensation in the mixing chamber go back to the bulk water 34 to be used for pre-humidification and steam generation. The pre-humidification process not only functions to partially humidify dry gas, it also uses, or recycles, this water and heat from condensation. Pre-humidification keeps the temperature of the bulk water at a lower temperature than the selected dew point temperature. Lower water temperature guarantees pre-humidified gas at a lower temperature than dew point temperature. The mixing of gas at lower temperature with vapor steam at higher temperature will bring the vapor temperature down and cause condensation, guarantying 100% relative humidity for the humidified gas. This pre-humidification procedure, which consumes water and heat, keeps water and heat balanced, thereby conserving demineralized water and heat. This feature substantially enhances the efficiency of the invention and simplifies temperature humidity control.

Figure 2:
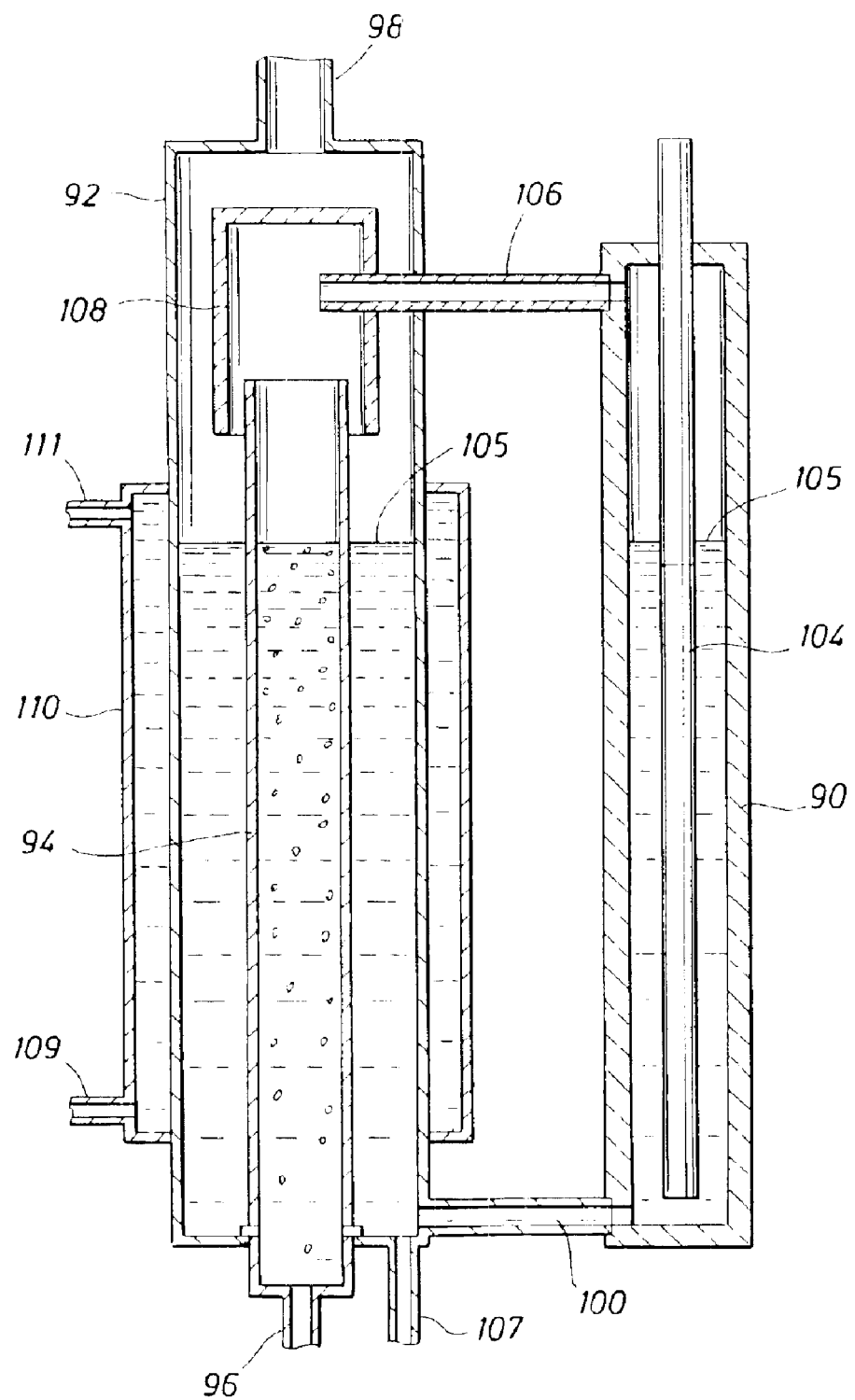
FIG. 2 is a presently preferred embodiment of a dew point humidifier of the invention.

An alternative embodiment of the present invention is shown in FIG. 2. In this embodiment, a boiler 90 is mounted as a separate component outside of a humidifier vessel 92. The vessel encloses a pre-humidifier 94, constructed as previously described in respect of FIG. 1. Dry gas enters at a gas inlet 96 and humidified gas exits the vessel at a gas outlet 98. A water path 100 from the pre-humidifier 94 or bulk water within the vessel is provided so that water can be supplied to the boiler naturally from the vessel, thereby maintaining a water level 102 in the vessel 92, the pre-humidifier 94, and the boiler 90. The water path 100 eliminates the need for a separate water level sensor and a water supply and recycling device. With this water path, the boiler may be considered to be integrated with humidifier for purposes of water level control, gas humidification, and temperature control. Water in the vessel and in the boiler are thus maintained at a level 105, and both may be drained through a drain 107. A heater element 104 develops vapor steam, which is introduced into the vessel through a steam injection line 106. The steam injection line penetrates into a mixing chamber 108 which is constructed and functions as previously described. The mixing chamber also serves as a condenser, and condensation from the mixing chamber is returned to the bulk water as before. The humidifier also may include a chill water jacket 110, fed from a chill water inlet 109 and emptying into a chill water outlet 111, as previously described.

Figure 3:
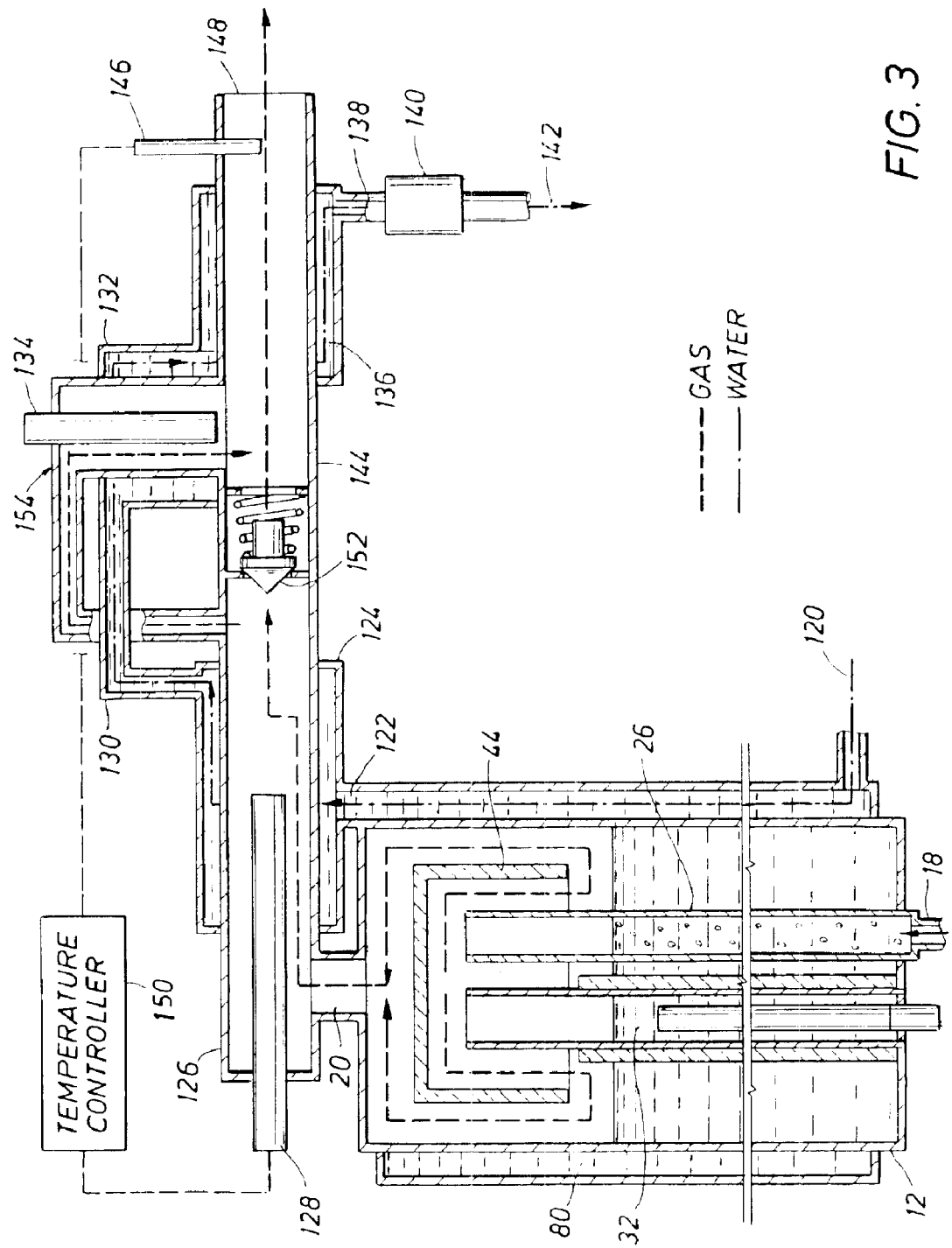
FIG. 3 is a schematic diagram of a dew point humidifier including temperature controlling aspects of the invention.

FIG. 3 illustrates another presently preferred embodiment of a humidifier of this invention. This embodiment provides a simple, efficient integration of the various components for humidification, gas heating, temperature tracing, and humidity sensing together, using the same coolant.

The vessel 12, pre-humidifier 26, boiler 32, the mixing chamber 44, and other various components are constructed as previously described in respect of FIG. 1. In this embodiment, however, chill water is provided at an inlet 120 flows into the jacket (see also FIG. 1) for temperature regulation and fast dew point decreasing. Instead of chill water, regular city tap water may be used for circulating chill water because it never comes in contact with the gas and vapor of the humidifier. The chill water flows upward through the jacket 80, until it reaches a chill water outlet 122 at the top of the vessel. At this point, the chill water has been heated to about dew point temperature, having received thermal energy from the outside surface of the vessel. The cooling effect of chill water makes the temperature control of boiler easier and smoother.

The heated circulating chill water then goes from the humidifier into a gas heater jacket 124, which surrounds and encloses a substantially horizontal gas heater 126. The gas heater 126 includes a heater element 128 positioned therein. The circulating chill water further heated in the gas heater jacket 124. The chill water then passes into a connecting line 130 and into a water jacket 132 for a humidity sensor 134.

It then flows into a gas outlet jacket 136. The gas outlet jacket 136 discharges into a chill water discharge line 138, through a back pressure controller 140 and out a chill water outlet 142.

The gas heater 126 heats up the gas-vapor mixture from the outlet 20 of the humidifier to approximately the set gas temperature. Because the circulating chill water is preheated in the jacket 80 to temperature close to dew point, it does not need to be preheated before meeting 100% humidified gas in the gas heater to prevent condensation. The water in the gas heater jacket 124 makes temperature control smooth and stable. It enables fast temperature change, both up and down, without significant overshoot.

The circulating chill water, which is further heated in gas heater jacket 124, is used for temperature tracing along a gas line or conduit 144. Thus, the gas line or conduit defines a jacketed tubing for gas transportation and gas temperature tracing along the gas line. Gas temperature in the gas line 144 may measured at a gas outlet 148 from the gas line 144 with a gas temperature sensor 146. The sensor 146 provides a temperature signal to a heater temperature controller 150 to control the cycling of the heater element 128. The use of the heated circulating chill water enables the temperature to be maintained at desired temperature at the outlet 148 from the gas line 144 and to be maintained at temperature close to this temperature along the gas line. This heated water enables uniform temperature control and smooth temperature transaction without significant overshoot.

The circulating chill water at the end of line can also be used for temperature control of humidity sensor jacket 132. It is important to have the temperature of humidity sensor to be kept close to gas temperature. Without this heated water, it is complicated and expensive to use a heater unit for the humidity sensor assembly, such as heat tape, to accomplish this function. Instead of using separate temperature control loops for gas heating, temperature tracing, and humidity sensor jacket heating, which will need separate temperature control systems, this method needs no extra heaters and controllers but only one heating loop for these functions. It eliminates extra systems, which include heating, cooling, circulating and control units.

Typically, a humidity sensor requires the condition of limited flow rate, usually less than 0.2 slpm (standard flow, standard liters per minute). Under conditions of high flow rate, a sampling mechanism is usually applied to a humidity sensing unit, which makes it complicated and expensive. The present invention, however, makes the humidity sensor 134 work properly for a high flow rate gas stream. A check valve 152 is installed in the main gas line and in parallel with a humidity sensor assembly 154. The check valve keeps pressure drop across the humidity sensor assembly lower than a preset value and hence controls the flow rate through the humidity sensor assembly lower than the pre-set value. When the flow rate of humidified gas through the line 144 is lower than this preset value, all gas flows through the humidity sensor assembly.

Operation of the Gas Humidifier

The thermodynamic operation of the humidifier starts with dry gas at or lower than ambient temperature and results in saturated gas at the dew point temperature at the outlet of the humidifier. In a first step, the gas travels through the pre-humidifier, an un-insulated pipe, absorbing heat from the bulk water and cooling the bulk water by the same amount of energy. In a second step, gas from the pre-humidifier mixes with steam from the boiler and forms a saturated gas-vapor-water droplets mixture and condenses. In a third step, the mixture flows through the "Y"-shaped water separator, where a saturated gas-vapor mixture flows up to the outlet. Water droplets carry heat from condensation down to the bulk water, thereby providing heat-water recycling and heat-water balancing.

The operation of the heating element in the boiler is controlled by the temperature of the gas-vapor mixture at the outlet of the humidifier as determined by a temperature sensor in order to maintain the dew point and maintain thermal balance within the apparatus. Using the structure of the present invention, a separate condenser and chiller is therefore eliminated, and the heat from the condensing gas-vapor mixture is released directly into the bulk water, thus conserving the energy that is lost in prior art systems using a separate condenser and chiller.

Thus, the heat balance of the apparatus is given by the following equation:

| Total heat needed to generate 100% humidified gas at the dew point from inlet gas and water | = Total heat from steam generator − heat loss to environment − heat to chill water |
|---|---|

This means that by controlling one simple parameter, the power of the heating element, the temperature of the gas-vapor mixture at the outlet of the humidifier is assured of being at the desired dew point. The precise humidification of the gas stream is assured for a continuous gas stream, regardless of the flow rate of the gas. In known humidification systems, the level of humidification of the gas stream varies with the flow rate and other parameters of the system before entering a separate condenser, and this drawback in the art is eliminated by the present invention.

In another preferred embodiment, the temperature of the humidified gas is further controlled by the operation of the gas stream heater, which is cycled by a control signal based on the temperature of the gas at the gas outlet. Chill water is circulated through the apparatus to provide stable operation of the humidification system.

The principles, preferred embodiment, and mode of operation of the present invention have been described in the foregoing specification. This invention is not to be construed as limited to the particular forms disclosed, since these are regarded as illustrative rather than restrictive. The invention should not be limited to water as coolant either. Moreover, variations and changes may be made by those skilled in the art without departing from the spirit of the invention.

I claim:

1. A gas humidifier comprising:
   a. a sealed vessel defining a vessel top, a vessel bottom, and a vessel side, the vessel adapted to retain a quantity of bulk water at a water level;
   b. a pre-humidifier comprising a vertically oriented tube within the vessel and having an open pre-humidifier top;
   c. a gas inlet adapted to convey gas into the pre-humidifier;
   d. a boiler within the vessel, the boiler having a heating element therein and further having an open boiler top;
   e. a mixing chamber above the pre-humidifier top and the boiler top; and
   f. an outlet adapted to convey humidified gas from the vessel.

2. The gas humidifier of claim 1, wherein the pre-humidifier receives dry gas from the gas inlet and creates gas bubbles to humidify the gas bubbles at below saturation, thereby discharging a pre-humidified gas.

3. The gas humidifier of claim 2, wherein the boiler develops steam vapor to mix with the pre-humidified gas from the pre-humidifier.

4. The gas humidifier of claim 1, wherein the pre-humidifier further develops pre-humidified gas with water in liquid form entrained therein.

5. The gas humidifier of claim 1, wherein the mixing chamber defines an open bottom container having a bottom edge above the level of the bulk water and below the top of the pre-humidifier and below the top of the boiler.

6. The gas humidifier of claim 5, wherein the bottom edge of the mixing chamber defines a moisture separation region having a "Y"-shaped cross section.

7. The gas humidifier of claim 5, wherein the bottom edge of the mixing chamber forms a moisture separation region having a downward gas-water mixture path, an upward gas path, and a water collector below the bottom edge.

8. The gas humidifier of claim 1, wherein the mixing chamber is formed of an insulating material.

9. The gas humidifier of claim 1, further comprising an insulating layer around the boiler.

10. The gas humidifier of claim 1, further comprising a fluid opening along the bottom of the vessel between the pre-humidifier and the quantity of bulk water.

11. The gas humidifier of claim 1, further comprising a fluid opening along the bottom of the vessel between the boiler and the quantity of bulk water.

12. The gas humidifier of claim 1, wherein the mixing chamber defines a flow path for the flow of a mixture of steam and pre-humidified gas and to separate condensation from saturated steam.

13. The gas humidifier of claim 12, wherein the flow path extends downward around the pre-humidifier and the boiler and above the level of the bulk water.

14. The gas humidifier of claim 1, further comprising:
   a. a water jacket around the vessel; and
   b. a source of circulating water in fluid communication with the water jacket.

15. The gas humidifier of claim 1, further comprising a temperature sensor at the outlet of the vessel.

16. The gas humidifier of claim 15, wherein the temperature sensor develops a temperature signal, and further comprising a temperature controller to receive the temperature signal and in response control the heater element.

17. The gas humidifier of claim 1, wherein the boiler develops vapor steam which exits the open top of the boiler, the pre-humidifier develops pre-humidified gas which exits the open top of the pre-humidifier, and the mixing chamber mixes the vapor steam and the pre-humidified gas, causing condensation of the vapor steam in the mixing chamber.

18. The gas humidifier of claim 17, wherein the condensation falls by gravity and inertia into the bulk water.

19. The gas humidifier of claim 1, wherein the gas exiting the vessel is at 100% relative humidity.

20. The gas humidifier of claim 1, further comprising a gas conduit in communication with the outlet of the vessel.

21. The gas humidifier of claim 20, further comprising a gas heater element in the gas conduit.

22. The gas humidifier of claim 21, further comprising:
   a. a gas conduit outlet from the gas conduit; and
   b. a gas temperature sensor at the gas conduit outlet.

23. The gas humidifier of claim 22, wherein the gas temperature sensor develops a gas temperature signal, and further comprising a gas heater controller to control the gas heater element in response to the gas temperature signal.

24. The gas humidifier of claim 20, further comprising a humidity sensor in the gas conduit.

25. The gas humidifier of claim 20, further comprising:
   a. a gas conduit water jacket around the gas conduit; and
   b. a source of circulating water in fluid communication with the gas conduit water jacket.

26. The gas humidifier of claim 20, further comprising:
   a. a vessel water jacket around the vessel;
   b. a source of circulating water in fluid communication with the vessel water jacket;
   c. a vessel water jacket outlet from the vessel water jacket;
   d. a gas conduit water jacket around the gas conduit; and
   e. a water line to convey circulating water from the vessel water jacket outlet to the gas conduit water jacket.

27. A gas conditioning system comprising:
   a. a gas stream humidifier adapted to develop a humidified gas;
   b. a gas heater line to receive humidified gas from the humidifier, the gas heater line having a gas heating element therein;
   c. a first chill water jacket around the humidifier, the chill water jacket having a first chill water inlet and a first chill water outlet; and
   d. a second chill water jacket around the gas heater line adjacent the gas heating element, the second chill water jacket having a second chill water inlet in fluid communication with the first chill water outlet, the second chill water jacket further having a second chill water outlet.

28. The system of claim 27, further comprising a check valve within the gas heater line.

29. The system of claim 28, further comprising a humidity sensor in the gas heater line in parallel with the check valve.

30. The system of claim 28, further comprising a third chill water jacket around the humidity sensor and having a third chill water inlet in fluid communication with the second chill water outlet, the third chill water jacket having a third chill water outlet.

31. The system of claim 30, further comprising a fourth chill water jacket around the gas heater line a spaced apart distance from the gas heater element, the fourth chill water jacket having a fourth chill water inlet in fluid communication with the third chill water outlet, the fourth chill water jacket further having a fourth chill water outlet.

32. The system of claim 27, wherein the gas heater line comprises jacketed tubing for gas transportation and gas temperature tracing along the gas heater line.

33. The system of claim 29, wherein the humidity sensor provides a control signal to maintain temperature within the gas heater line such that humidified gas within the gas heater line remains close to the dew point temperature.

* * * * *